Figure 1:
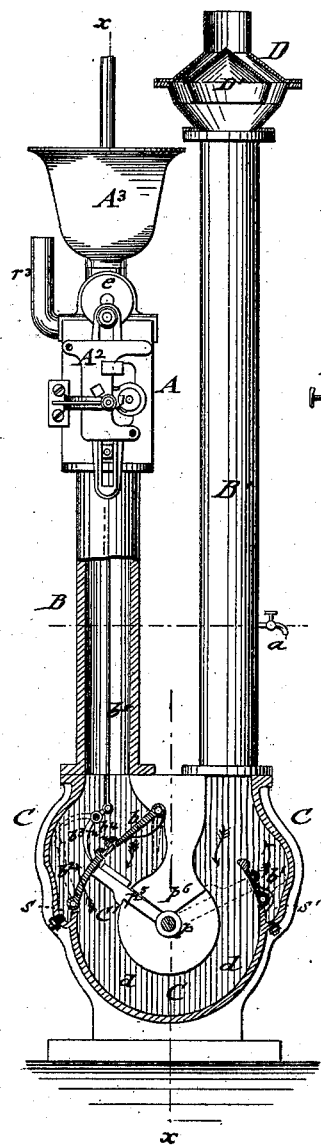

J. WERTHEIM.
ATMOSPHERIC GAS ENGINE.

No. 192,206.  Patented June 19, 1877.

3 Sheets—Sheet 1.

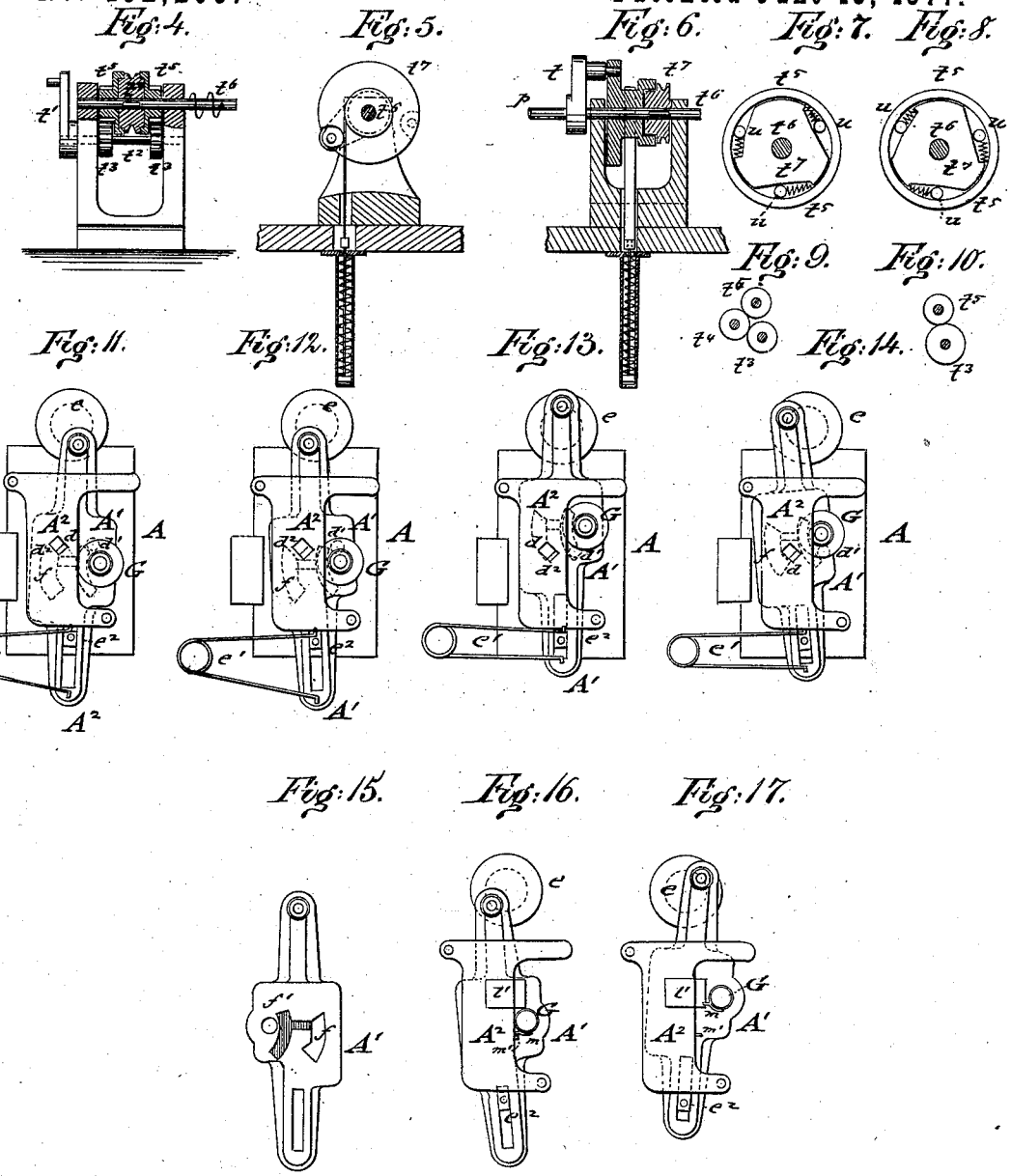

J. WERTHEIM.
ATMOSPHERIC GAS ENGINE.
No. 192,206. Patented June 19, 1877.
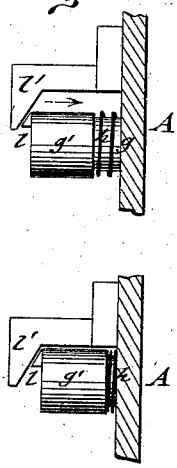
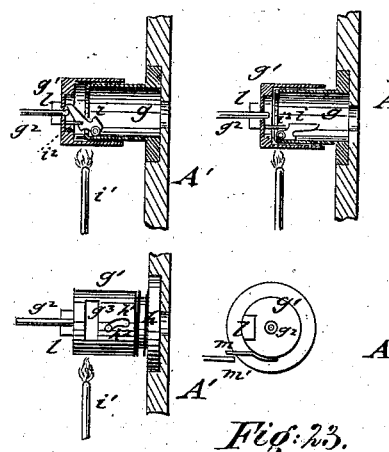
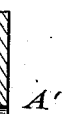
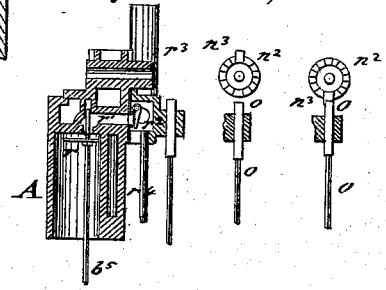
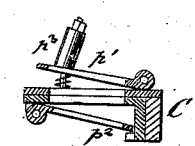
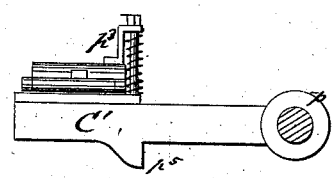
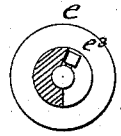
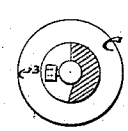
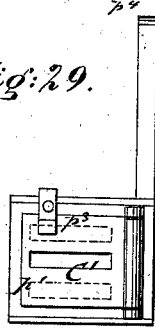
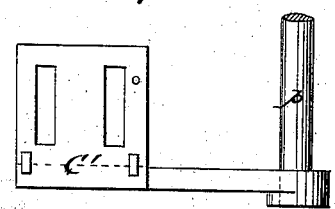
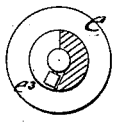
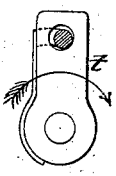
WITNESSES:
Chas. Nida
J. H. Scarborough
INVENTOR:
J. Wertheim
BY
ATTORNEYS.
N. PETERS, PHOTO-LITHOGRAPHER, WASHINGTON, D. C.

UNITED STATES PATENT OFFICE.

JOSEPH WERTHEIM, OF BORNHEIM, NEAR FRANKFORT-ON-THE-MAIN, GERMANY.

IMPROVEMENT IN ATMOSPHERIC GAS-ENGINES.

Specification forming part of Letters Patent No. 192,206, dated June 19, 1877; application filed April 9, 1877.

*To all whom it may concern:*

Be it known that I, JOSEPH WERTHEIM, of Bornheim, near Frankfort-on-the-Main, Germany, have invented a new and Improved Atmospheric Gas-Engine, of which the following is a specification:

This invention relates to such improvements in the atmospheric gas-engine for which Letters Patent were granted to me, dated December 26, 1876, and numbered 185,709, that the construction of the motor is simplified, its shape made more compact and symmetrical, and the operation rendered smoother and more reliable.

The principle on which the construction of the motor is based—namely, the alternate action of the explosive force of a gas-and-air mixture and of the pressure of the atmosphere, as motive powers—remains the same, as well as the general arrangement of the different parts, which consist, essentially, in the explosion-dome, with its main slide-valve, igniting apparatus, and appendages for regulating the speed of the engine and admitting the escape of the gases of combustion; next of the siphon-pipe for the liquid-piston, with its paddle-chamber and valves at the lower part, in connection with mechanism for transmitting motion; and, finally, of the liquid-reservoir.

The improvements consist of the construction of the slide-valve to produce a more favorable distribution of air and gas at the ignition-point of the explosion-dome, then in a modified form of the igniting apparatus, and the simpler construction of the escape-valves for the gases of combustion from the explosion-chamber.

A main improvement consists in the arrangement of an oscillating paddle, with valves for the forward and return motion of the liquid-piston by the explosions of the gas-and-air-mixtures and the alternating pressure of the atmosphere, and of suitable mechanism for changing the oscillating motion of the paddle into continuous rotary motion of the main shaft for transmitting the power of the engine.

In order to facilitate the description of the improved parts, I will first recapitulate the working of the engine.

The siphon-shaped tube is provided at its lowermost bent part with an oscillating paddle inclosed in a suitable case. One end of the siphon-tube supports the explosion-dome with its appendages, while the other end supports a liquid-reservoir. The siphon-tube is filled with water, forming a liquid-piston. Air and gas, mixed in proper quantities, are admitted to the explosion-dome, and their entrance regulated by the slide-valve carrying the igniting apparatus. The mixture, when ignited, explodes and forces the liquid downward through the paddle-case and up into the other part of the siphon-tube and its reservoir. The *vis viva* of the liquid is taken up by the paddle and transmitted to the main shaft. The return of the liquid is produced by the vacuum formed after the explosion, and the atmospheric pressure, which causes the liquid to flow back into the explosion-dome. The gases of combustion are expelled by the rapidly-returning liquid, which, on receding, is acted upon by another explosion of the gas-and-air mixture, and so on, the alternating explosion and vacuum producing the forward and return motion of the liquid, the oscillating motion of the paddle, and the transmission of power from the shaft of the same.

Figure 2:
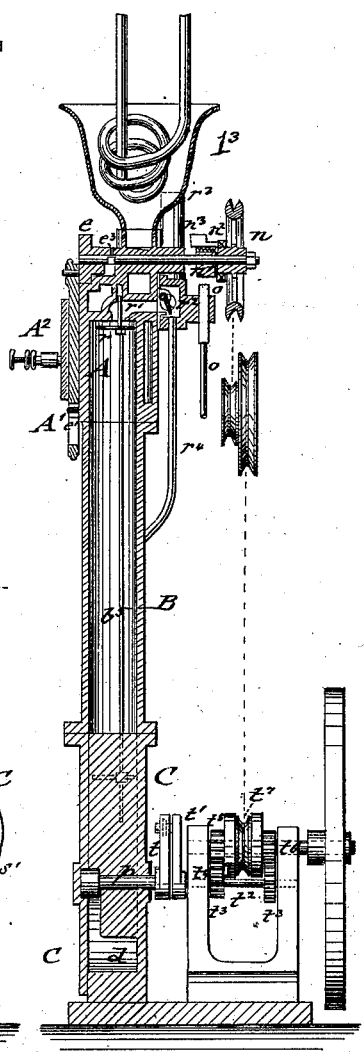
Figure 3:
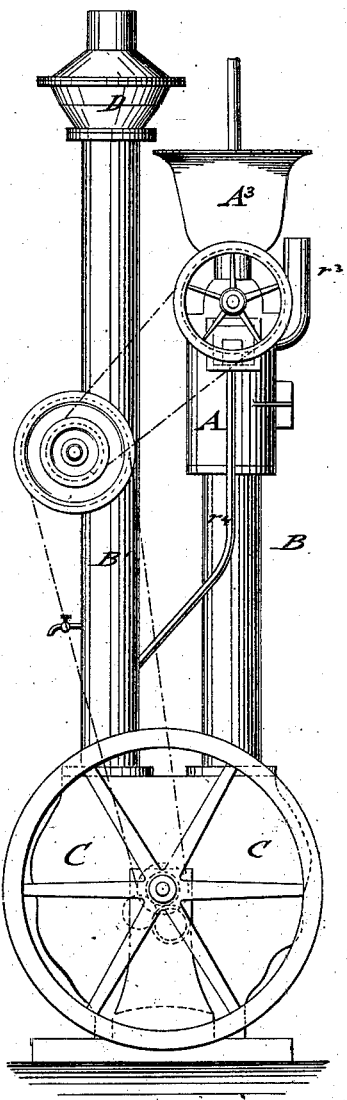

In the accompanying drawings, Figure 1 represents a front view of my improved atmospheric gas-engine, partly in section to show interior of paddle-case. Fig. 2 is a vertical transverse section of the same on line *x x*, Fig. 1, showing the mechanism for transmitting the power to the driving main shaft in side elevation. Fig. 3 is a rear elevation of the engine. Figs. 4, 5, 6, 7, 8, 9, and 10 are detail views of sections of the devices for transmitting the motion of the oscillating paddle to the continuously-revolving main shaft. Figs. 11, 12, 13, 14, and 15 show the slide-valve in the different positions before, during, and after the explosion. Figs. 16, 17, 18, 19, 20, 21, 22, and 23 are detail views and sections, showing the improvements of the igniting apparatus of the slide-valve. Figs. 24 and 25 are detail views of the governor device. Fig. 26 is a vertical central section of the explosion-dome with its escape-valves for the combustion-gases. Figs. 27, 28, 29, and 30 are detail views of the oscillating paddle. Figs. 31, 32, and 33 show a modified construction of the crank-disk; and Fig. 34 is a detail end view of the crank-arm of the paddle-shaft.

Similar letters of reference indicate corresponding parts.

By referring to the drawing, A represents the explosion-dome, of cylindrical shape, closed at the upper end and provided with one straight side, along which the main slide-valve $A^1$ is guided in suitable manner.

The explosion-dome A communicates, by a siphon-tube, B B', of U shape, with parallel legs, with a paddle-case, C, at the lowermost or bent portion of the siphon-pipe, and with a liquid-reservoir, D, at the other end of the tube, the reservoir being preferably arranged at greater height above the case C than the explosion-dome.

The engine is filled through the reservoir D with a suitable liquid, until, by passing through the siphon tube, paddle-case and dome, it fills the entire engine. The liquid in the leg below the reservoir is then let out by means of a faucet, $a$, Fig. 1, until it is level with the same. (Shown in dotted line in Fig. 1.)

The engine is now ready for the explosion in the dome, the liquid acting by the same as a kind of movable piston, which forms air-tight connection with the parts of the engine. This liquid-piston is forced by the explosion-dome into the paddle-casing C, passing into the same by a pivoted valve, $b$, and acting on the oscillating paddle C', so as to revolve the same, the liquid passing in the channel $d$ of the case, around the lower bent portion of the siphon-tube, to the opposite side of the case, and, through a valve, $b^1$, of the same, into the second leg of the siphon-tube and into the liquid-reservoir.

The vacuum produced by the explosion in the dome and in the upper part of the siphon below the same closes valves $b$ and $b^1$, and forces, by the atmospheric pressure, the liquid immediately back through the case, the same acting on the paddle C', so as to swing it back, returning through a third valve, $b^2$, near the exit-valve $b^1$, back into the siphon-pipe and dome, to be acted on again in the same manner by the successive explosions of the air-and-gas mixture.

The explosion-dome A has an entrance-opening, $d$, for the explosive mixture of air and illuminating-gas, and near to it a second opening, $d^1$, which serves as place of ignition, as shown in Figs. 11 to 15.

The slide-valve $A^1$ slides along the straight face of the dome A, and is covered by a recessed plate, $A^2$, which is secured in detachable manner to the dome A. The slide-valve $A^1$ is operated by a revolving crank-disk, $e$, to which the upper end of the slide-valve is pivoted, and by a spring, $e^1$, attached to the lower slotted end of the slide-valve, said lower end being guided along a square pivoted block, $e^2$, of the dome.

The crank-disk $e$ slides loosely upon its shaft, the hub of the same being partly recessed, as shown in Figs. 2, 31, 32, and 33, to be engaged by a fixed pin, $e^3$, of the shaft, and turned over the upper dead-point.

The revolving disk raises thereby the slide-valve until, after the disk has passed its upper dead-point, the slide-valve is quickly drawn down by the action of the spring at the lower end.

The slide-valve $A^1$ has on the inner side, facing the dome, a segmental slot, $f$, which forms communication with the entrance-opening $d$ of the dome during the upward motion of the slide-valve, while the ignition-opening remains closed by the same.

During the downward motion of the slide-valve the supply-opening $d$ will be closed, but the ignition-opening $d^1$ brought, for an instant only, into communication with the igniting apparatus G, affixed to the slide-valve, so as to cause the ignition of the explosive mixture of gas and air.

The segmental slot $f$ is connected with a correspondingly-shaped groove, $f'$, at the inner side of the slide-valve $A^1$, which groove passes, during the upward motion of the slide-valve, over the ignition-point $d^1$, while during the downward motion of the slide-valve the same passes sidewise of the ignition-point, as shown in Figs. 11 to 14. This groove $f'$ serves to feed directly the ignition-point $d^1$ with mixed gas, in order to obtain a sure ignition of the mixture in the explosion-dome.

The gas-and-air mixture is thereby simultaneously supplied to the dome through the entrance-opening $d$ and the ignition-opening, and thereby the successive ignition of the explosive mixture obtained in the most reliable manner, without any danger of interruption that may happen when, by a quick series of explosions, the air and gas are not thoroughly mixed at the ignition-point, so as to render the explosions uncertain. The gas and air enter through two small oblong openings, $d^2$, of plate $A^2$, of which one is larger than the other, and which correspond with the entrance-opening $d$ of the dome.

The openings $d^2$ supply, in connection with the segmental slot $f$ of the slide-valve and the entrance-opening $d$, a regular supply of gas and air in the required proportions to the dome during the upward motion of the slide-valve, closing the entrance-opening $d$ during the downward motion.

The igniting apparatus G is shown in detail in Figs. 18 to 23, and consists of a cylindrical casing, $g$, that is attached to the slide-valve $A^1$, and open at the point of connection to communicate with the ignition-opening $d^1$ of the dome.

Snugly fitted over the casing $g$ is a sliding-cap, $g^1$, that carries at the center of its closed end the burner $g^2$, through which the gas is supplied to the interior of the casing $g$.

The sliding-cap $g^1$ is provided with two openings, $g^3$, through which the atmospheric air enters into the casing $g$ when the slide-valve is at its lowermost point. The air enters also through the opening of the slide valve, and expels thus the gases of combustion that fill the entire casing $g$ by the explosion.

The cap $g^1$ is cushioned by a spiral spring, $h$, that encircles the casing $g$, and so connected to the same that it exerts a sliding and turning influence upon the cap $g^1$, which is guided by a curved slot, $h^1$, along a fixed pin, $h^2$, of the casing $g$.

A deflecting-hood, $i$, is pivoted to the interior of casing $g$, and pressed by a spring through the open end of the casing $g$ on the burner $g^2$. The hood serves to deflect the gas from the burner to a small gas-flame of a pipe, $i^1$, at the side of the dome, so as to light the burner $g^2$ at the moment when the igniting apparatus communicates with the air.

A fixed stud, $l$, of the sliding-cap $g^1$ forms contact with a fixed arm $l'$ of the covering-plate $A^2$ of the slide-valve when the latter arrives at its highest point, and bears by its inner inclined face against the stud or projection $l$, so as to turn the cap $g^1$, and press the same back at the same time along the casing $g$ toward the slide-valve, as shown in Figs. 18 and 19.

The cap is guided by the pin $h^2$, which, together with the slot $h^1$ and spring $h$, assists the turning of the cap, so as to shut off the connection of the casing with the atmospheric air.

The hood $i$ is thrown back into horizontal position in casing $g$ by the sliding motion of the cap and the contact of a fixed interior pin, $i^2$, of the cap $g^1$, as shown in Fig. 21. The flame of the burner is thereby admitted into the center of the casing $g$, so as to ignite the explosive mixture in the dome at the moment when the slide-valve passes over the ignition-opening.

No gas can escape through the casing, because the cap closes tightly the same. At the moment when the slide-valve arrives at its lowermost point a fixed outer rod, $m$, of the cap meets a fixed point or stud, $m'$, of the face-plate $A^2$, as shown in Figs. 16, 17, and 23, and turns thereby the cap $g^1$ sufficiently that the guide-pin $h^2$ is returned into the straight part of the curved slot $h^1$, and thereby the cap thrown forward by the spiral spring, admitting the instant entrance of the atmospheric air. The igniting-flame of the burner, which has been extinguished by the force of the explosion, is then again ignited through the slot $g^3$ by the flame of the fixed pipe $i$, so as to ignite the next charge of the gas-and-air mixture on the downward motion of the slide-valve.

At the opposite end of the shaft of the crank-disk $e$ is placed a loose pulley, $n$, and a driver, $n^1$, keyed inside of the loose pulley to the shaft. The hub of the pulley $n$ is provided at the inside with a ratchet, $n^2$, into which a sliding spring-pawl, $n^3$, catches. The pulley is connected, by suitable cords or bolts and intermediate pulleys, with the driving-pulley of the main shaft revolved by the operation of the oscillating paddle, and imparts motion, by suitable bevel-wheels, to a centrifugal governor that is connected with a vertically sliding and guided rod, $o$, which is raised by the governor when the machine revolves at too high a speed, so as to disengage pawl $n^3$ from the pulley, which then turns loosely upon the shaft without turning the crank-disk $e$. The slide-valve remains thereby at its lowermost point until the motion of the governor is relaxed, and thereby the rod $o$ moved downward to admit the clearing of the pawl and the throwing back again of the same into the ratchet of the pulley $n$, which imparts then again motion to the slide-valve, so as to continue the explosions.

The oscillating paddle $C'$ is shown in detail in Figs. 27, 28, 29, and 30, and is keyed to its shaft $p$, being fitted by its enlarged end into the liquid-channel $d$, so as to close the same tightly. The paddle $C'$ has two openings or slots, which are covered at the upper side by a valve $p^1$, and at the lower side by a valve, $p^2$. The upper valve $p^1$ is held in open position by a spring, and pressed against a stop, $p^3$. The lower valve $p^2$ is opened by its own weight, and retained by a rest, $p^4$.

As soon as the mixed gas enters the dome A the valve $b$ is opened by the weight of the liquid, which escapes through the open valve $p^1$ of the paddle into the channel $d$. The explosion of the gas presses the valve $p^1$ tightly on the seat on the paddle $C'$, so that the same closes the channel, and is instantly thrown over to the other end of the channel by the force of the explosion.

When the vacuum in the tube and siphon-tube is formed the lower valve $p^2$ is closed by the atmospheric pressure, and the paddle returns to the first position.

The paddle $C'$ moves, by a nose, $p^5$, along the interior solid portion of the paddle-case $C$, and prevents the arm of the paddle from knocking against a radial shoulder, $p^6$, of the case. As soon as the nose $p^5$ has passed its end point some liquid is pressed into the triangular space between shoulder $p^6$ and the arm of the paddle by small holes between paddle and case, which liquid forms a cushion to take off the *vis viva* of the paddle. The force of the liquid opens then the spring-acted valve $b^2$, and the liquid escapes into the communicating leg of the siphon-tube.

When the liquid has arrived at its highest point the valve $b^1$ is closed by its spring and the atmospheric pressure, and the paddle moved back by the direct action of the returning liquid. During the backward motion of the paddle the entrance-valve $b$ is closed by its spring, and the liquid in front of the paddle is then forced through the valve $b^2$, sidewise of valve $b$, in the direction of the arrow shown in Fig. 1, and up into the connecting siphon-tube and into the explosion-dome.

The opening of the return-valve $b^2$ moves a fulcrumed lever, $b^3$, that bears by its longer arm on the upper side of valve $b^2$, and serves to close the valve again by a spring, $b^4$. The shorter arm of the fulcrumed lever $b^3$ is connected by a pivot-rod, $b^5$, running up through the siphon-tube B and dome A, with a valve mechanism, $r$, for discharging the waste gas. This valve $r$ is attached to the upper end of rod $b^5$, which is guided in a suitable sockethole of the top part of dome A, so as to move the valve $r$ steadily up and down.

By the opening of the valve $b^2$ the valve $r$ is drawn down, and the waste gas may readily pass out through a channel, $r^1$, valve $r^2$, and exit-tube $r^3$, as shown in Figs. 2 and 26. Any liquid carried mechanically along is returned through a tube, $r^4$, to the leg B' of the siphon.

When the liquid enters the dome, the valve $r$, and, by the rod $b^5$, also the valve $b^2$, are closed, so that the explosion-dome and the paddle are ready for the next explosion. The paddle-case C has two small reservoirs or pockets, $s$ and $s'$, below the valves $b^2$ and $b^1$, which take up all the impurities, and are emptied by taking out, from time to time, their closing-plug.

The power imparted to the oscillating paddle C' is transmitted from the shaft $p$ by any suitable mechanism adapted for changing rotary reciprocating motion into rotary continuous motion. For the purpose of illustration, I will describe two different methods that are specially adapted for this machine, of which one is shown in Figs. 2, 4, 7, 8, and 9, the second in Figs. 5, 6, and 10. The first mechanism consists of toothed wheels and two ratchet-wheels, the second of alternately contracting and expanding spring and a ratchet-wheel. Either device is connected by a spring-cushioned pin with the driving crank-arm $t$ of paddle-shaft $p$, (shown in Fig. 34,) which crank oscillates a second crank, $t^1$ on its shaft $t^2$. To this shaft are keyed two pinions, $t^3$, of which one revolves by an intermediate wheel, $t^4$, turning loosely on its shaft, a gear-wheel, $t^5$, of the main shaft $t^6$, while the second pinion meshes directly with a gear-wheel, $t^5$, of main shaft $t^6$. The gear-wheels $t^5$ are placed loosely on their shaft $t^6$, and extended by fixed side caps over a central cord-pulley, $t,^7$ which, like the fly-wheel, is keyed fast to main shaft $t^6$.

The oscillating motion of the paddle-shaft imparts an oscillating motion to the pinions, which revolve the loose wheels and caps in opposite directions, as one pinion gears by an intermediate cog-wheel, the other directly with the same. The direction of motion of the loose wheels and caps alternates with the oscillating motion of the pinions, so that by a double clutch device, that is provided between the caps of the loose gear-wheels and the cord-pulley, one of the caps turns the pulley continuously in the revolving direction of the fly-wheel.

The clutch device consists of cylindrical pins $u$, that slide in wedge-shaped side recesses of the driving-pulley. The cylindrical pins $u$ are pressed forward by spiral springs in the direction in which the main shaft revolves, and are pushed into the wedge-shaped channels or recesses by the alternating action of the encircling caps, so as to produce the continuous rotary motion of the driving-pulley. The other cap goes back during the action of one cap, without exerting any influence upon the pulley. The spring-cushioned connecting-pin of the driving-cranks prevents too great a strain of the paddle on the clutch device of the caps.

In the second device for changing the rotary reciprocating motion of the paddle-shaft to continuous rotary motion, the driving-pulley $t^7$, Figs. 5 and 6, is placed on the main shaft $t^6$, and connected with one loose pulley and by overlapping cap and pin connection only. The loose pulley is connected to the oscillating crank-shaft $t$, and follows the motion of the same. The cylindrical pins are operated only in one direction of the loose pulley, while in the other direction the cap of the same runs loosely over the cord-pulley. During the explosion the cap runs loosely over the cord-pulley, but expands, by a band fixed to the loose pulley, a spiral spring, that serves for the purpose of storing up power, so as to act on the return oscillation jointly with the clutch action of the loose pulley on the shaft of the cord-pulley.

In the former arrangement the force of the explosion and of the atmospheric pressure is transmitted separately and alternately on the fly-wheel, while in the second arrangement the force of the explosion and atmospheric pressure is accumulated and exerted simultaneously on the fly-wheel.

For the purpose of preventing the overheating of the explosion-dome, the same is provided with a water-jacket, that is filled from a vessel, $A^3$, at the top of the dome, in which the water is kept cool either by a current of cold air pumped through a coil in the vessel or by other suitable appliances.

The reservoir-carrying leg B' of the siphon-tube is extended above the explosion-dome, and the reservoir D provided with an interior conical cap, D', that allows the free entrance of the atmospheric air, but prevents the escape of the liquid by the cap and a lower part, placed at an angle to the top part of the cap, as shown in Fig. 1.

For starting the engine the water is first brought to its proper level by the faucet $a$, the igniting-flame then lighted, the gas-supply cock opened, and the fly-wheel put in motion by hand until the first explosion takes place, when the machine will continue to run.

By the turning of the fly-wheel the paddle is not moved, as the fly-wheel and cord-pulley turn loose in their driving-caps; but as soon as these are turned by the oscillating motion of the paddle the clutch device acts on the fly-wheel and keeps up the continuous motion of the same, as described.

Having thus described my invention, I claim as new and desire to secure by Letters Patent—

1. The combination of the explosion-dome A, siphon-tube B B', paddle-casing C, having valves $b$, $b^1$, and $b^2$, oscillating paddle C', and the liquid-piston, actuated alternately by the force of the explosion and the pressure of the atmospheric air, substantially in the manner and for the purpose set forth.

2. The combination of the explosion-dome A, having entrance and and ignition openings $d$ $d^1$, with a reciprocating slide-valve, $A^1$, having slot $f$ and communicating groove $f'$, to supply the gas-and-air mixture simultaneously through both openings, substantially as and for the purpose set forth.

3. The combination of the explosion-dome and of the reciprocating spring-actuated slide-valve $A^1$ with a loose crank-disk, $e$, having recessed hub, and with a driving-pin, $e^3$, on the revolving crank-disk shaft, to admit rapid downward passage of slide-valve, substantially as set forth.

4. The combination of the explosion-dome A and slide-valve $A^1$ with an igniting apparatus, G, composed of a casing, $g$, and of a sliding and spring-actuated cap, $g^1$, with burner and air-supply recesses, substantially as described.

5. The combination of explosion-dome A and slide-valve $A^1$ with fixed casing $g$, having interior pivoted deflecting-hood $i$, with sliding and guided spring-cap $g^1$, having fixed inner rod $i^2$, burner $g^2$, and outer stud $l$, and with outer inclined stop $l'$ of face-plate $A^2$, to prepare ignitor for explosion, substantially as specified.

6. The combination of the explosion-dome A and slide-valve $A^1$ with fixed casing $g$, sliding and guided spring-cap $g^1$, having outer pin $m$, and with stop $m^1$ of face-plate $A^2$, to open ignitor after explosion, substantially as described.

7. The combination of the explosion-dome, slide-valve, and ignitor, having interior burner, deflecting-hood, and air-slots, with a fixed gas-pipe that relights the burner after each explosion, substantially as set forth.

8. The combination of the explosion-dome A, siphon-tube B B', paddle-casing C, having valves $b$ $b^1$ $b^2$, with oscillating paddle C', having recesses with upper and lower pivoted valves $p^1$ $p^2$, to work in conjunction with the liquid-piston, substantially in the manner set forth.

9. In a gas-engine, the paddle-casing C, having side pockets $s$ $s'$, with detachable plugs, to collect and remove impurities, substantially as set forth.

10. The combination of the explosion-dome A, siphon-tube B B', paddle, and paddle-casing with return-valve $b^2$, fulcrumed and spring-actuated lever $b^3$, valve-rod $b^5$, and escape-valve $r$, to open or close valve of dome, as required, substantially as described.

11. In a gas-engine, the combination of explosion-dome A and siphon-tube B B' with escape-valve $r$, channel $r^1$ valve $r^2$, and exit-tube $r^3$, to admit expulsion of gases of combustion, substantially as set forth.

12. The combination of the explosion-dome, siphon-tube, paddle-case, and oscillating paddle with suitable mechanism, constructed substantially as shown, for changing the reciprocating motion of paddle-shaft into continuous rotary motion, substantially in the manner and for the purpose set forth.

13. In a gas-engine constructed substantially as shown, a siphon-tube having its reservoir-carrying leg extended above the explosion-dome, substantially as described.

JOSEPH WERTHEIM.

Witnesses:
R. WM. WEBSTER.
PRENTISS WEBSTER.